(12) United States Patent
Tanaka

(10) Patent No.: US 8,500,381 B2
(45) Date of Patent: Aug. 6, 2013

(54) DIVIDING PRINT DATA FOR PROCESSING FOR BOOKBINDING

(75) Inventor: Hirotomo Tanaka, Kawasaki (JP)

(73) Assignee: Canon Kabushiki Kaisha (JP)

( * ) Notice: Subject to any disclaimer, the term of this patent is extended or adjusted under 35 U.S.C. 154(b) by 570 days.

(21) Appl. No.: 12/341,333

(22) Filed: Dec. 22, 2008

(65) Prior Publication Data

US 2009/0168098 A1 Jul. 2, 2009

(30) Foreign Application Priority Data

Dec. 26, 2007 (JP) ................................ 2007-335062

(51) Int. Cl.
*B42C 9/00* (2006.01)
*G06F 3/12* (2006.01)

(52) U.S. Cl.
USPC ............................................... 412/1; 358/1.1

(58) Field of Classification Search
USPC ...................... 358/1.15, 1.1; 412/1
See application file for complete search history.

(56) References Cited

U.S. PATENT DOCUMENTS

| 7,773,238 B2 * | 8/2010 | Chae | 358/1.13 |
|---|---|---|---|
| 2002/0051139 A1 * | 5/2002 | Akabane et al. | 358/1.2 |
| 2006/0029293 A1 * | 2/2006 | Matsuzaki | 382/298 |
| 2006/0215910 A1 | 9/2006 | Megawa | |
| 2006/0221358 A1 | 10/2006 | Takahashi | |
| 2006/0265672 A1 * | 11/2006 | Shiono et al. | 715/861 |
| 2006/0290967 A1 * | 12/2006 | Sumitomo et al. | 358/1.14 |
| 2007/0058191 A1 * | 3/2007 | Harigae | 358/1.15 |

FOREIGN PATENT DOCUMENTS

| JP | 2000-261648 A | 9/2000 |
|---|---|---|
| JP | 2006-270266 A | 10/2006 |
| JP | 2006-285610 A | 10/2006 |
| JP | 3912012 B2 | 2/2007 |

* cited by examiner

*Primary Examiner* — Eric A Rust
(74) *Attorney, Agent, or Firm* — Rossi, Kimms & McDowell LLP

(57) ABSTRACT

Proposed is an image processing apparatus in which the data processing method is changed over in suitable fashion in accordance with job settings when binding is performed. To accomplish this, the image processing apparatus is such that when stored image data is processed, the output format is determined from a job ticket and processing for dividing image data is controlled in accordance with the output format determined. In accordance with the output format determined, the apparatus changes over the output timing of divided page image data.

9 Claims, 23 Drawing Sheets

FIG. 7

USER BOX / ⬢ 00 :     TOTAL 12

| ✓ | TYPE | DOCUMENT NAME | PAPER SIZE | PAGES | DATE/TIME |
|---|------|---------------|------------|-------|-----------|
|   | 📄 | 20060317091700 | A4 | 0 | 03/17 09:17 |
|   | 📄 | 20060321133124 | A4 | 0 | 03/21 13:31 |
|   | 📄 | 20060406192225 | A4 | 0 | 04/06 19:22 |
|   | 📄 | 20060406192237 | A4 | 0 | 04/06 19:22 |
|   | 📄 | 20060406192244 | A4 | 0 | 04/06 19:22 |
|   | 📄 | 20060406192251 | A4 | 0 | 04/06 19:22 |

◀ 1/2 ▶

SELECT ALL (UP TO 100 DOCUMENTS)

DETAILED INFORMATION ▲     ERASE     LIST PRINT

OUTPUT ▲     READ IN ORIGINAL ▲     DIVIDE AND OUTPUT ▲     EDIT MENU

MOVE/DUPLICATE ▲     MOVE/DUPLICATE TO HOLD ▲     CLOSE ↵

SYSTEM MONITOR ▲

| TYPE | DOCUMENT NAME | PAPER SIZE | PAGES | DATE/TIME |
|---|---|---|---|---|
| ✓ 1 | 20060317091700 | A4 | 0 | 03/17 09:17 |
| | 20060321133124 | A4 | 0 | 03/21 13:31 |
| | 20060406192225 | A4 | 0 | 04/06 19:22 |
| | 20060406192237 | A4 | 0 | 04/06 19:22 |
| | 20060406192244 | A4 | 0 | 04/06 19:22 |
| | 20060406192251 | A4 | 0 | 04/06 19:22 |

USER BOX  ◇ 00:  TOTAL 12  1/2

CANCEL SELECT

DETAILED INFORMATION ▲  ERASE  LIST PRINT

READ IN ORIGINAL ▲  DIVIDE AND OUTPUT ▲  (801)  EDIT MENU

OUTPUT ▲

MOVE/DUPLICATE ▲  MOVE/DUPLICATE TO HOLD ▲  CLOSE

SYSTEM MONITOR ▲

| USER BOX | ⌘ 00: | | | TOTAL 12 |
|---|---|---|---|---|
| ✓ TYPE | DOCUMENT NAME | PAPER SIZE | PAGES | DATE/TIME |
| 1 | 20060317091700 | A4 | 0 | 03/17 09:17 |
|  | 20060321133124 | A4 | 0 | 03/21 13:31 |
|  | 20060406192225 | A4 | 0 | 04/06 19:22 |
|  | 20060406192237 | A4 | 0 | 04/06 19:22 |
|  | 20060406192244 | A4 | 0 | 04/06 19:22 |
|  | 20060406192251 | A4 | 0 | 04/06 19:22 |

◀ 1/2 ▶

DETAILED INFORMATION ▲    ERASE    LIST PRINT

CANCEL SELECT    READ IN ORIGINAL ▲    DIVIDE AND OUTPUT ▲ — 901    EDIT MENU

OUTPUT ▲    MOVE/DUPLICATE TO HOLD ▲    CLOSE ⤴

MOVE/DUPLICATE ▲    SYSTEM MONITOR ▲

| TYPE | DOCUMENT NAME | PAPER SIZE | PAGES | DATE/TIME |
|---|---|---|---|---|
| | 20060317091700 | A4 | 0 | 03/17 09:17 |
| | 20060321133124 | A4 | 0 | 03/21 13:31 |
| 1 | 20060406192225 | A4 | 0 | 04/06 19:22 |
| | 20060406192237 | A4 | 0 | 04/06 19:22 |
| | 20060406192244 | A4 | 0 | 04/06 19:22 |
| | 20060406192251 | A4 | 0 | 04/06 19:22 |

USER BOX  00:   TOTAL 12   1/2

CANCEL SELECT   DETAILED INFORMATION ▲   ERASE   LIST PRINT

OUTPUT ▲   READ IN ORIGINAL ▲   DIVIDE AND OUTPUT ▲ — 1001   EDIT MENU

MOVE/DUPLICATE ▲   MOVE/DUPLICATE TO HOLD ▲   CLOSE

SYSTEM MONITOR ▲

1000

FIG. 12
NORMAL JOB
FRONT SIDE BACK SIDE
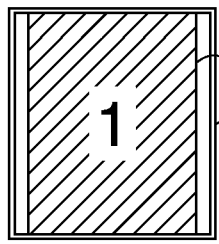 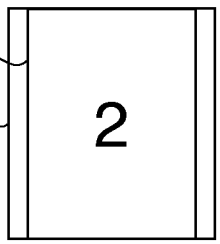
~1201
~1202
PAGE 1  PAGE 2
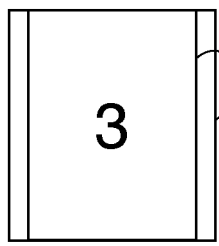 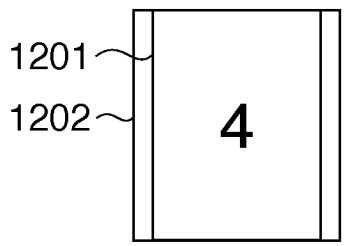
PAGE 3  PAGE 4
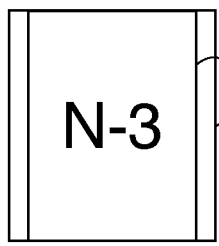 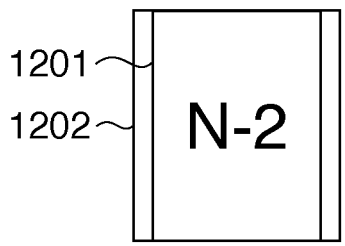
PAGE N-3  PAGE N-2
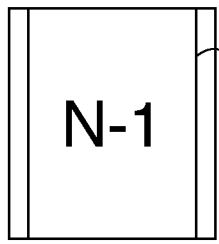 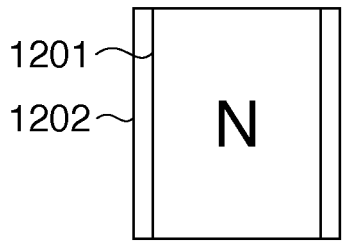
PAGE N-1  PAGE N
IMAGE FILE ~ 1203

Nup (Z-TYPE, 4-up)

LEFT-OPEN N-PAGE PROCESSING (IN CASE OF EVEN NUMBER)

F I G. 22

COMMON SPECIFICATIONS SETTING — 2200

- DIVIDE-AND-OUTPUT SETTING
- FUNCTION AFTER AUTO-CLEAR
  ▷ RESTORE
- BUZZER ON/OFF
- RESIDUAL PAPER MESSAGE DISPLAY
  ▷ ON
- TEXT/PHOTO PRIORITY AT TIME OF MONOCHROME SELECTION IN AUTOMATIC COLOR SELECTION
  ▷ PHOTO PRIORITY

2201

1/8

CLOSE

SYSTEM MONITOR

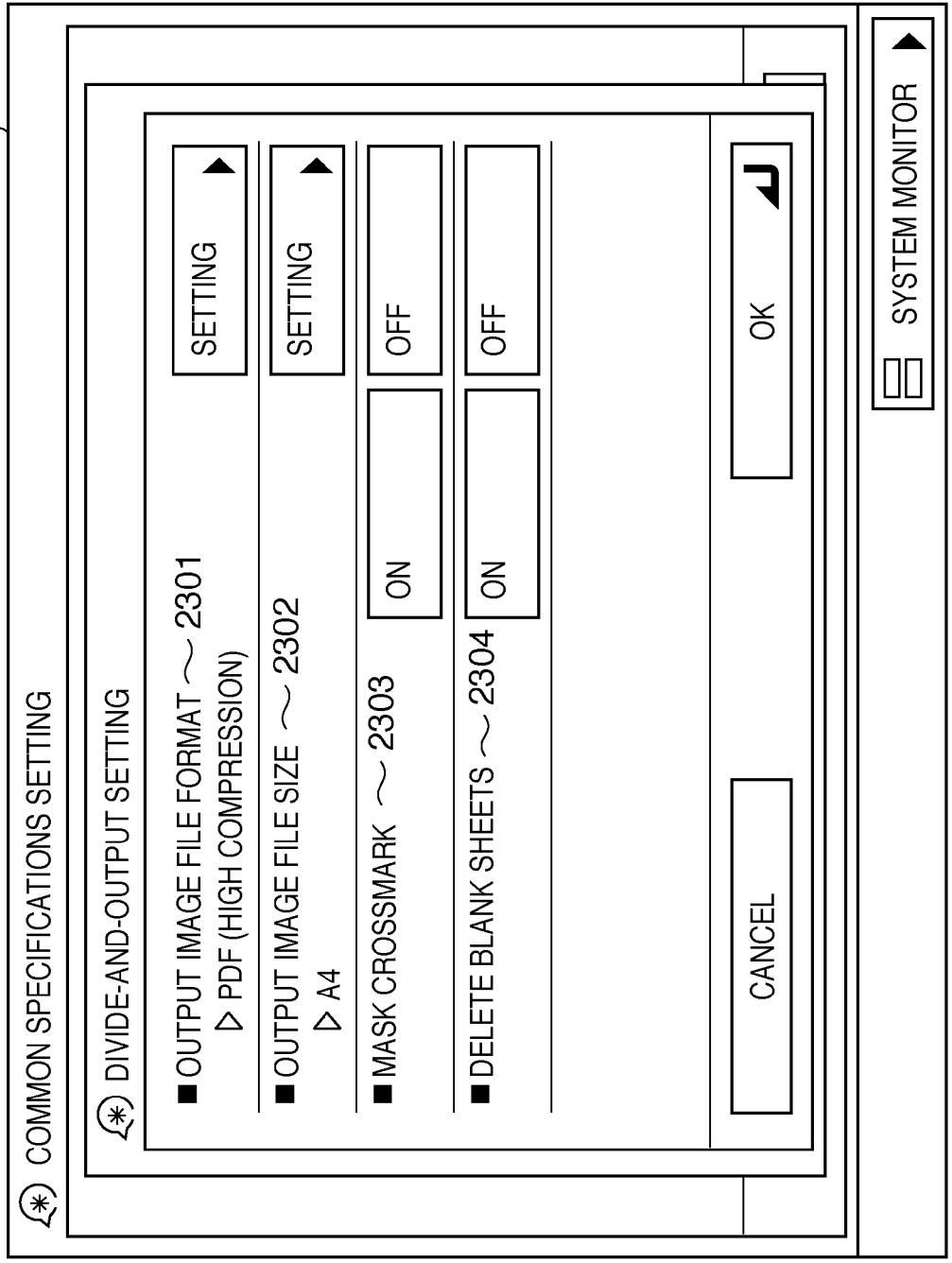

DIVIDING PRINT DATA FOR PROCESSING FOR BOOKBINDING

BACKGROUND OF THE INVENTION

1. Field of the Invention

The present invention relates to an image processing apparatus for dividing impositioned image data into a plurality of pages, and to a method of controlling this apparatus.

2. Description of the Related Art

For jobs in which imposition binding has been performed by a DTP (Desktop Publishing) application or utility, there is a function for repetitive job introduction by storage in the memory of an image processing apparatus. This has made it possible to shorten the time it takes to perform imposition binding of image data. However, with regard to jobs in which imposition binding has been performed by a DTP application or utility, there may be a need to obtain an output in which imposition and binding settings have been removed.

Japanese Patent Laid-Open No. 2006-285610 proposes an image processing apparatus in which re-printing is prepared for by storing pre-RIP data in a memory. This makes it unnecessary for the user to re-introduce a non-imposition job from an application and therefore shortens operation time. Further, Japanese Patent No. 3912012 proposes an image dividing apparatus for dividing images from impositioned image data. With the image dividing apparatus described in Japanese Patent No. 3912012, a plurality of pages of page image data are divided based upon an image file, in which a plurality of items of image data have been impositioned, and the job settings.

However, the following problems arise in the prior art mentioned above: For example, with the image processing apparatus described in Japanese Patent Laid-Open No. 2006-285610, it is necessary to store image data in memory beforehand in order to perform re-printing, and the size of the image data stored in memory becomes very large. As a consequence, it is necessary to increase memory storage capacity or to place a limit on the number of documents that can be stored.

On the other hand, with the image dividing apparatus described in Japanese Patent No. 3912012, only post-RIP data is stored in memory and hence there is no particular problem ascribable to memory storage capacity. However, when the number of bound and impositioned pages increases, the problem is that the operation of dividing impositioned images takes time.

SUMMARY OF THE INVENTION

The present invention enables the provision of an image processing apparatus in which the method of data processing can be changed over in suitable fashion in accordance with job settings when binding is performed.

One aspect of the present invention provides an image processing apparatus for storing all pages of image data of a processed job and a job ticket having information concerning output format of the job, comprising: a determination unit configured to determine the output format of the job based on the job ticket; a division unit which, in a case where the determined output format is an output format in which a plurality of pages of page image data are output upon being lay out on a per-sheet basis, is configured to divide the page image data that is included in the image data; an output unit configured to output the page image data that has been divided; and a switching unit configured to switch output timing, at which the page image data that has been divided is output, in accordance with the determined output format.

Another aspect of the present invention provides a method of controlling an image processing apparatus for storing all pages of image data of a processed job and a job ticket having information concerning output format of the job, comprising: determining the output format of the job based on the job ticket; in a case where the determined output format is an output format in which a plurality of pages of page image data are output upon being lay out on a per-sheet basis, dividing the page image data that is included in the image data; outputting the page image data that has been divided; and switching output timing, at which the page image data that has been divided is output, in accordance with the determined output format.

Further features of the present invention will become apparent from the following description of exemplary embodiments (with reference to the attached drawings).

BRIEF DESCRIPTION OF THE DRAWINGS

FIG. 7 is a diagram illustrating a job selection screen 700 of the multifunction peripheral 103 according to this embodiment;

FIG. 8 is a diagram illustrating a job selection screen 800 according to this embodiment;

FIG. 9 is a diagram illustrating a job selection screen 900 in a state in which an N-in-1 job has been selected in this embodiment;

FIG. 10 is a diagram illustrating a job selection screen 1000 in a state in which a saddle stitching job has been selected in this embodiment;

FIG. 12 is a diagram illustrating layout of a normal job;

FIG. 22 is a diagram illustrating a common specifications setting screen 2200; and FIG. 23 is a diagram illustrating a divide-and-output setting screen 2300.

DESCRIPTION OF THE EMBODIMENTS

A preferred embodiment of the present invention will now be described in detail with reference to the drawings. It should be noted that the relative arrangement of the components, the numerical expression and numerical value set forth in these embodiment do not limit the scope of the present invention unless it is specifically stated otherwise.

<Overall Configuration>

Figure 1:
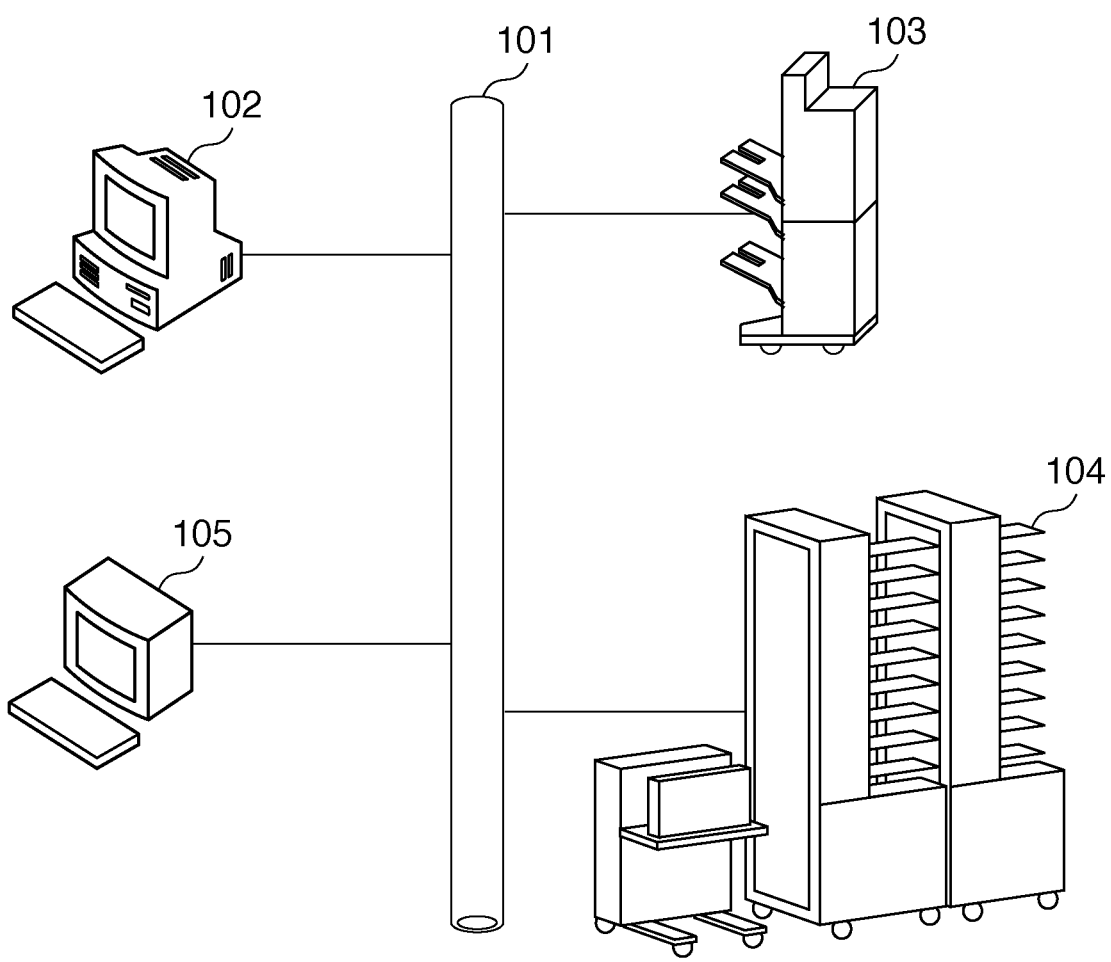
FIG. 1 is a diagram illustrating the configuration of a system according to an embodiment of the present invention.

An embodiment of the present invention will be described below with reference to FIGS. 1 to 23. FIG. 1 is a diagram illustrating the configuration of the system according to this embodiment.

Personal computers 102 and 105 in which a DTP application and utilities have been installed are connected to a network 101. Also connected to the network 101 are a multifunction peripheral (MFP) 103 having a plurality of functions such as copy, print and facsimile functions for operating as an image forming apparatus, and a finishing apparatus 104 for subjecting a printout to finishing. A plurality of other personal computers, MFPs and finishers besides those illustrated in FIG. 1 are also connected to the network 101 but are not shown.

<Configuration of Personal Computer>

Figure 2:
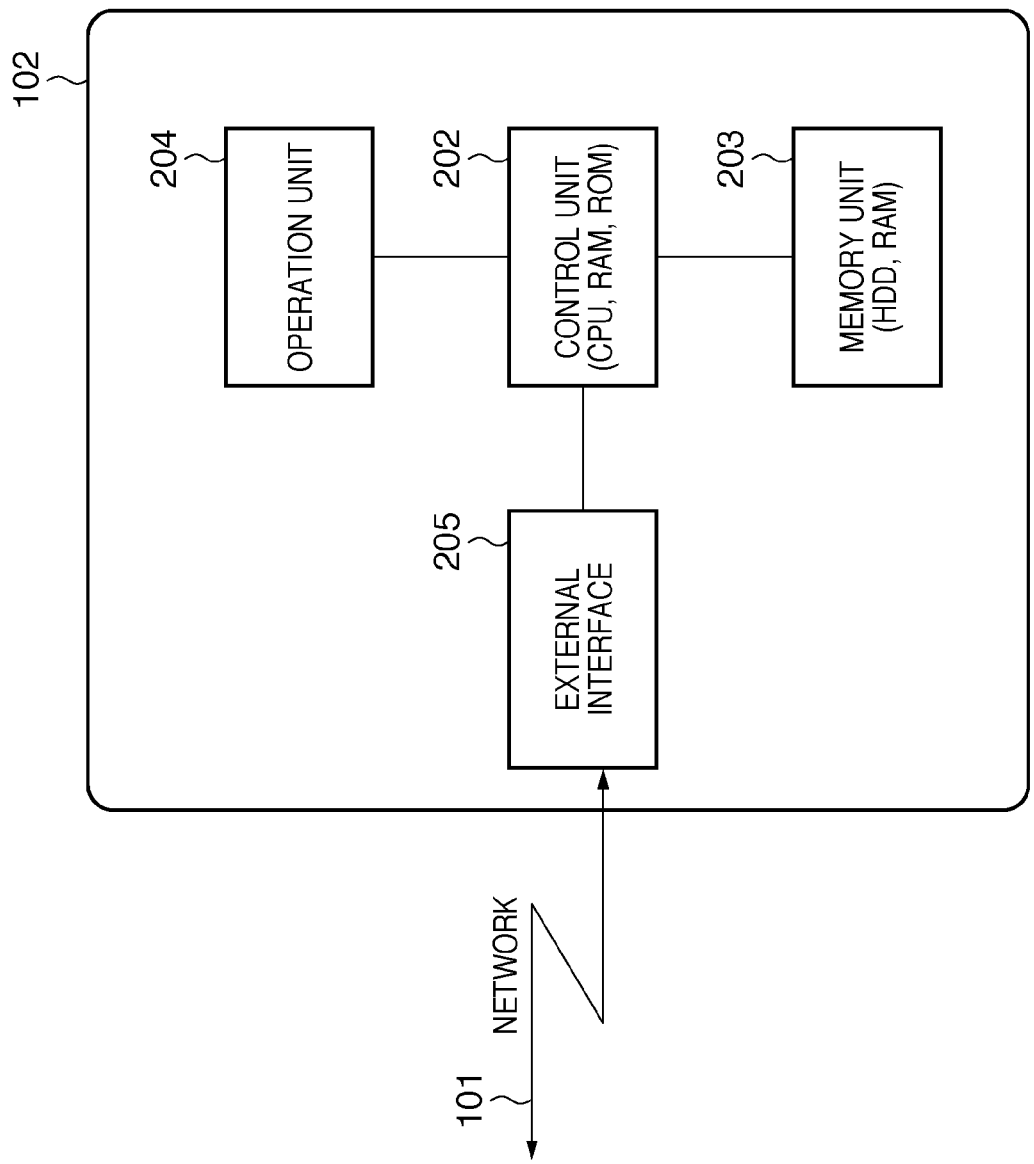
FIG. 2 is a block diagram illustrating an example of the configuration of a personal computer according to the embodiment.

The configuration of the personal computer 102 will be described with reference to FIG. 2. FIG. 2 is a block diagram illustrating an example of the configuration of the personal computer 102 according to this embodiment.

The personal computer 102 includes a control unit 202 comprising a CPU and RAM for processing a plurality of commands, and a memory unit 203 comprising a hard-disk drive and RAM for storing various information. Further, the personal computer 102 has an operation unit 204 for displaying result of processing to the user via a display unit such as a monitor and accepting input commands from the user. Furthermore, the personal computer 102 has an external interface 205 connected to the network 101 for communicating with the MFP 103, the other personal computer 105 and the finishing apparatus 104.

An application and driver for printing electronic documents have been installed in the personal computer 102. When the user issues a print command via the operation unit 204, the personal computer 102 transmits an image file, which represents an electronic document capable of being printed, and a job ticket in which binding settings are described to the MFP 103 and finishing apparatus 104 via the driver. The image file and job ticket shall be referred to as a "job" below. Settings such as binding and imposition settings used when MFP 103 creates a printed material have been written in the job ticket of the job introduced. "Imposition" is the process of arranging individual pages on a sheet of paper so that after they are printed and folded, the resulting pages will be in the proper order. Imposition processing is carried out by a DTP application for controlling document creation, editing and printing, etc., from the personal computer 102. Further, the image file comprises a plurality of items of image data.

<Configuration of MFP>

Figure 3:
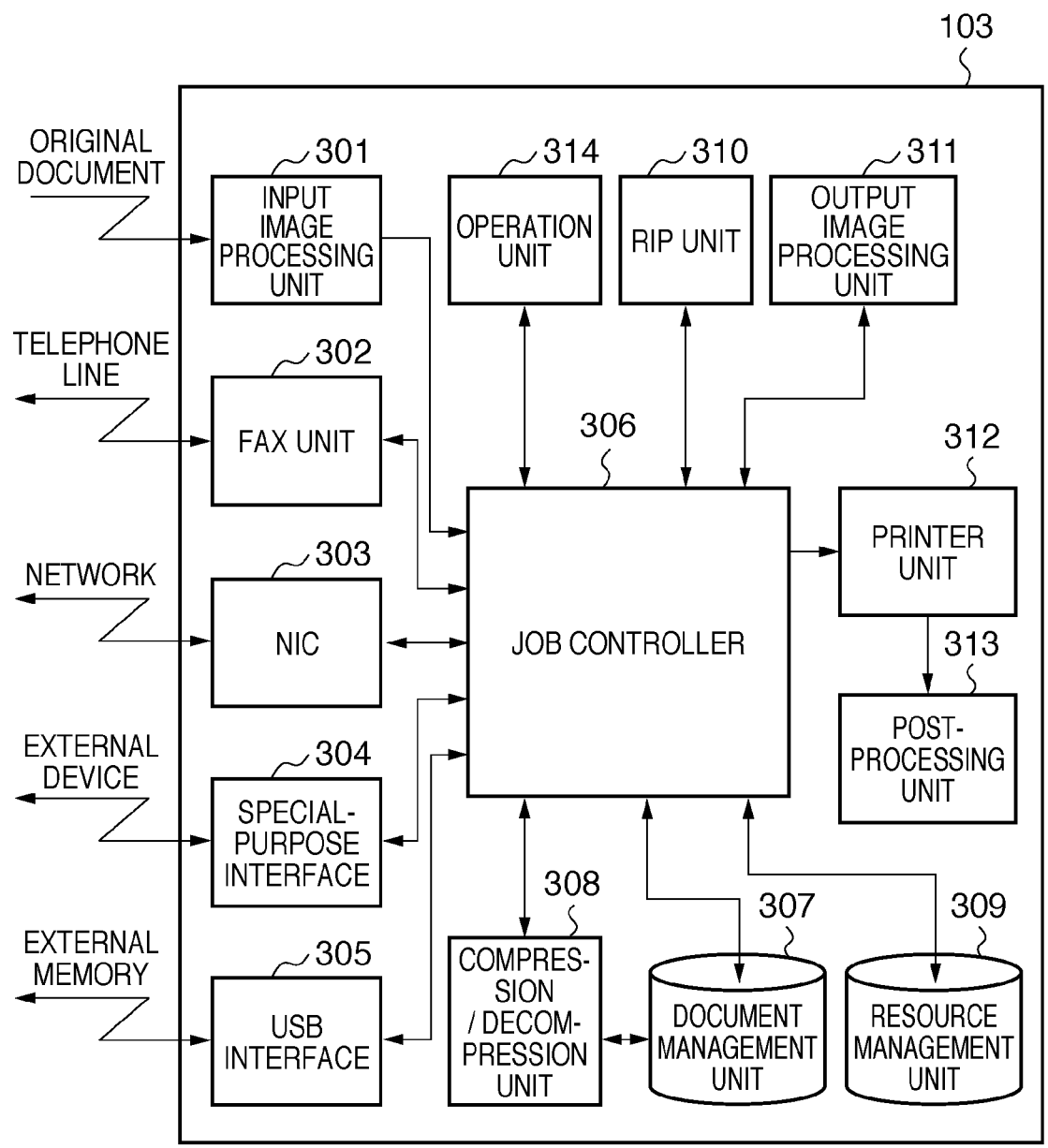
FIG. 3 is a block diagram illustrating an example of the configuration of a multifunction peripheral according to the embodiment.

The configuration of the MFP 103 will be described next with reference FIG. 3. FIG. 3 is a block diagram illustrating an example of the configuration of the MFP 103 according to this embodiment.

The MFP 103 has a memory such as a hard disk for storing data representing a plurality of jobs. The MFP 103 further has a copy function for printing job data, which has been output from a scanner, by a printer 312 via the memory, and a print function for printing job data, which has been output from an external apparatus such as a computer, by the printer 312 via the memory. Thus, the MFP 103 is an image processing apparatus having a plurality of functions.

There are full-color MFPs and monochrome MFPs. With the exception of color processing and internal data, often the full-color MFP incorporates the structure of the monochrome MFP in terms of its basic components. Accordingly, the description below will be limited to the full-color MFP and a description relating to a monochrome MFP will be rendered only when necessary.

Further, as mentioned above, this system has an MFP-type image processing apparatus provided with a plurality of functions. Further, the system may have an SFP (Single-Function Peripheral) such as a single-function image processing apparatus equipped with only a print function. Furthermore, the system may have only an image processing apparatus of either type. Regardless of the type of image processing apparatus, the system may have a plurality of thereof.

<MFP Data Input Unit>

As illustrated in FIG. 3, the MFP 103 has an input image processing unit 301 serving as an input unit for externally applied data for reading the image of an original document or the like and applying image processing to the read image data. The MFP 103 further includes a FAX unit 302 for sending and receiving images utilizing a telephone line as in the manner of a facsimile, and an NIC (Network Interface Card) 303 for exchanging image data and device information utilizing the network. The MFP 103 further includes a special-purpose interface 304 for performing an information exchange of image data or the like with an external apparatus. The MFP 103 has a USB (Universal Serial Bus) interface 305 for sending and receiving image data to and from a USB device typified by a USB memory (one type of removable medium).

The MFP 103 further includes a job controller 306, a document management unit 307, a compression/decompression unit 308, a resource management unit 309, a RIP unit 310, an output image processing unit 311, a printer unit 312, a post-processing unit 313 and an operation unit 314. These block s will be described below in greater detail.

<MFP Document Management Unit 307>

The document management unit 307 has a memory such as a hard disk for storing a plurality of items of image data. More specifically, image data from the input image processing unit 301 is stored in the document management unit 307. Also stored in the document management unit 307 are image data of a facsimile job that has entered via the FAX unit 302, and image data from an external apparatus such as a computer entered via the NIC 303. Also stored in the document management unit 307 is image data of a plurality of types such as various image data that has entered via the special-purpose interface 304 and USB interface 305.

Further, the document management unit 307 reads out image data that has been stored on the hard disk, transfers the image data to an output unit such as the printer unit 312 and executes output processing such as print processing by the printer unit 312. Further, in response to a command from the operator, the document management unit 307 controls the transfer or distributed transfer of image data, which has been read out of the hard disk, to at least one external apparatus such as a computer or other image processing apparatus.

<MFP Resource Management Unit 309>

Various parameter tables commonly handled such as fonts, color profiles and gamma tables are stored in the resource management unit 309. The resource management unit 309 is capable of calling these values as necessary. Further, the resource management unit 309 can store new parameter tables, revise these tables and update them. The resource management unit 309 also manages printing speed and information such as the number of usable physical channels for communication.

<Configuration of MFP Operation Unit 314>

Figure 4:
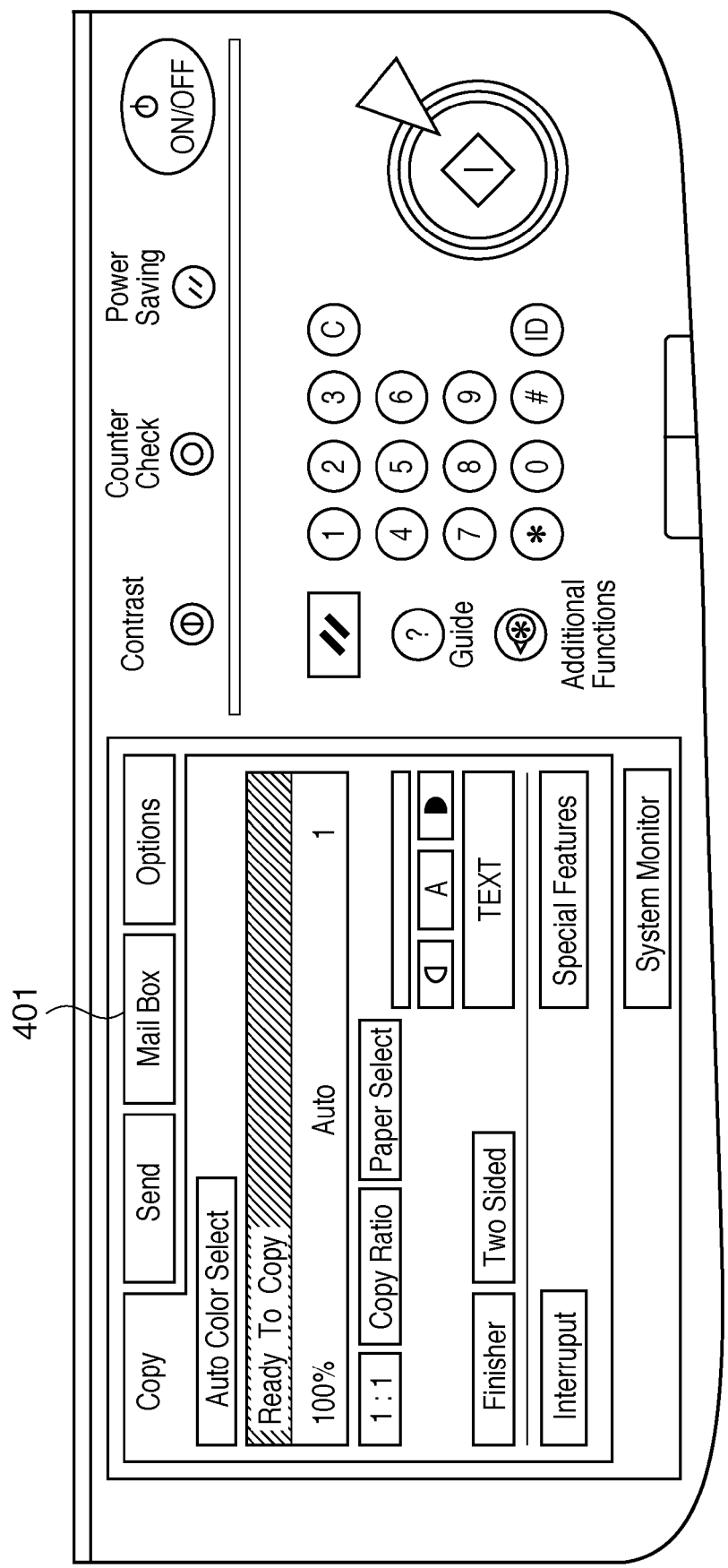
FIG. 4 is a diagram illustrating an example of an operation unit 314 according to this embodiment.

FIG. 4 is a diagram illustrating an example of the configuration of the operation unit 314 according to this embodiment. The operation unit 314 has a touch-panel-type LCD 401 capable of displaying the status of the MFP 103 and of entering commands, and hard keys such as a numeric keypad and power button.

A user interface conforming to functions implemented by the MFP 103 is displayed on the LCD 401. The screen displayed on the LCD 401 undergoes a transition in accordance with an input from the touch panel or an input from the hard keys. The operation unit 314 comprises a plurality of screens and has respective operation interfaces in accordance with operations (copy, fax, box introduction, remote scanner, etc.) of the MFP 103. Further, the operation unit 314 is so adapted (system status/abort button) that it is possible to ascertain the MFP 103 job processing status and hardware status (whether the door is open, whether the apparatus is out of paper, etc.).

As hard keys the operation unit 314 has contrast volume (Contrast) for changing the contrast of the LCD 401 and counter button (Counter Check) for displaying a counter screen. Further, the operation unit 314 has a power button for turning the power supply on and off, a power save button (Power Saving) for turning off only the power supply of the LCD 401, and a reset button for canceling an operation. The operation unit 314 also has a guide button (Guide) for presenting the user with a guide display, and a user mode button (Additional Function) for causing the screen to transition to the user mode. The operation unit 314 further includes a numeric keypad for inputting numerals, and an execute button for starting copying and scanning. By performing an exchange with the job controller 306, etc., updating is performed at all times based upon input that has been input from these hard keys. The job controller 306 controls the transition of the screen using this information.

<MFP Job Controller 306>

The job controller 306 controls processing such as temporary storage of image data and path decision in accordance with the functions of the MFP 103 that are used. Specifically, the job controller 306 smoothens the flow of jobs and changes over the path of data for every function of the MFP 103. Although it is known generally to store image data as intermediate data when necessary, here access in which the document management unit 307 is the starting point and end point will be described. Further, processing by the compression/decompression unit 308 and post-processing unit 313 or job controller 306, which are utilized as necessary, will be omitted and the flow of data or processing will be described.

A) Copy function: scanner input unit→image processing unit→printer unit

B) Facsimile send function: scanner input unit→FAX unit

C) Facsimile receive function: FAX unit→image processing unit→printer unit

D) Network scan: scanner input unit→NIC

E) Network print: NIC→PDL unit→image processing unit→printer unit

F) Scan to external apparatus: scanner input unit→special-purpose interface

G) Print from external apparatus: special-purpose interface→PDL unit→image processing unit→printer unit H) Scan to external memory: scanner input unit→USB interface I) Print from external memory; USB interface→PDL unit→image processing unit→printer unit J) Box scan function: scanner input unit→image processing unit→document management unit K) Box print function: document management unit→printer unit L) Box receive function: NIC→PDL unit→image processing unit→document management unit M) Box send function: document management unit→NIC N) Preview function: Document management unit→operation unit Besides the above, various other combinations of functions such as an e-mail service and web server function are conceivable but will not be described here.

Box scan, box print and box receive or box receive are processing functions of the MFP 103 accompanied by writing or reading of data utilizing the document management unit 307. These are functions for dividing the memory within the document management unit 307 on a per-job or per-user basis, storing data temporarily, combining the data with a user ID or password and then inputting or outputting the data.

The operation unit 314 allows the user to select various flows and functions and to enter operation commands. However, with an increase in the resolution of the display unit of the operation unit 314, it is also possible preview certain image data on the document management unit 307 and then print the image after confirming that the image is acceptable.

<Divide-and-Output Processing>

Division processing according to this embodiment will be described below with reference to FIGS. 5 to 19. First, reference will be had to FIG. 17 to describe division processing conforming to job settings.

Figure 17:
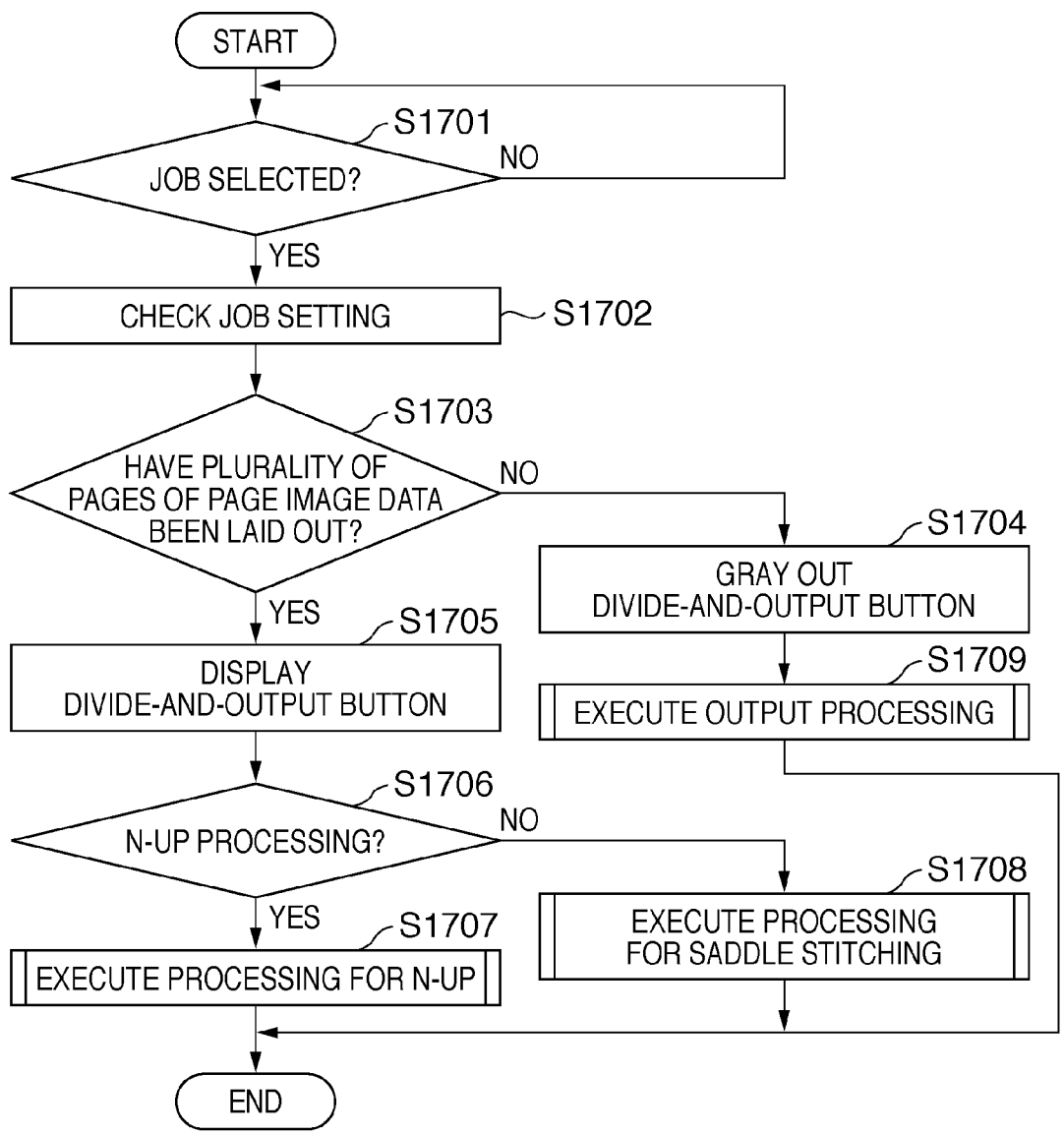
FIG. 17 is a flowchart illustrating division processing according to this embodiment.

FIG. 17 is a flowchart illustrating division processing according to this embodiment. The processing described below is executed under the overall control of the job controller 306.

In a case where printing using a DTP application or utility is stored in the document management unit 307 of the MFP, impositioned image data corresponding to all pages and a job ticket for which post-processing (output format) such as finishing after impositioning are stored. This embodiment is such that in a case where a stored job is processed again, the output format (normal job, N-in-1 job, saddle stitching job) included in the job ticket is determined and the output method is changed over in accordance with the output format determined. For example, in the case of a normal job, the image data is output without executing processing to divide the image data. In the case of an N-in-1 job and saddle stitching job, on the other hand, image data of a plurality of pages lay out to the image data is divided and output. Furthermore, a decline in the productivity of the MFP 103 is suppressed by changing over the output timing for outputting the page image data divided by each job. Accordingly, the job controller 306 functions as a switching unit, as will be described below.

Figure 5:
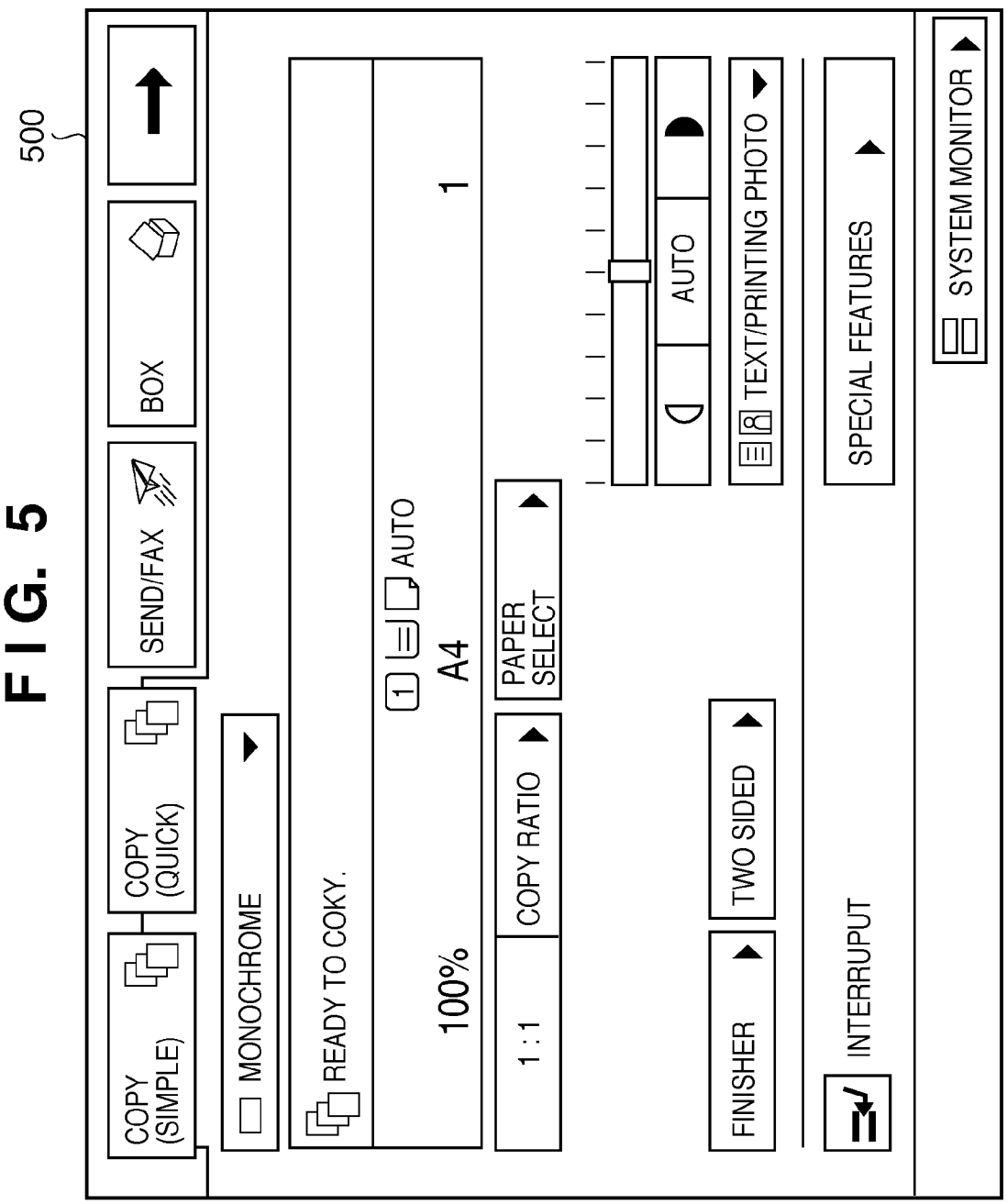
FIG. 5 is a diagram illustrating a copy screen 500 of the multifunction peripheral 103 according to this embodiment.
Figure 6:
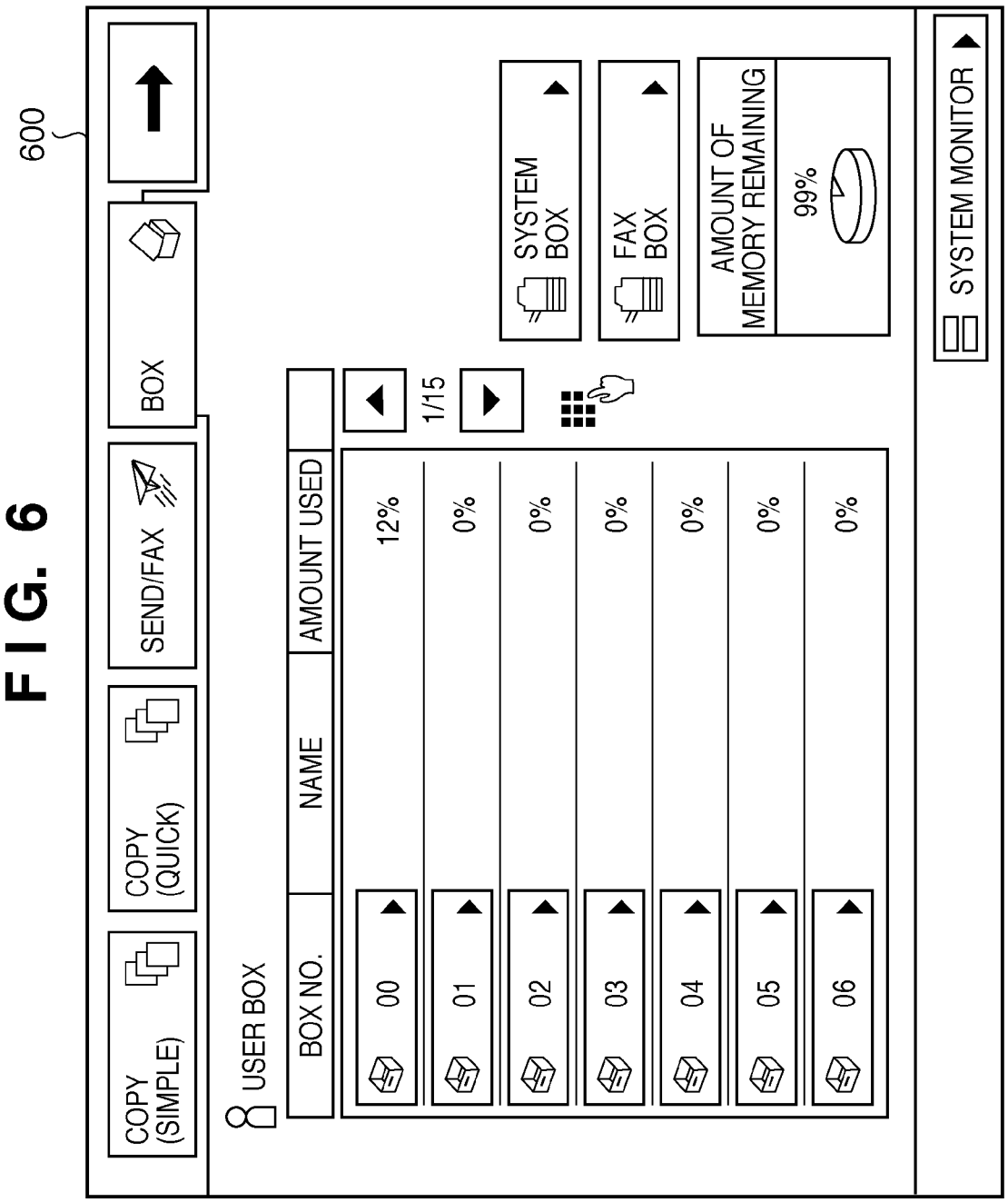
FIG. 6 is a diagram illustrating a user box screen 600 of the multifunction peripheral 103 according to this embodiment.

In step S1701, the job controller 306 determines whether a job stored in memory is one selected by the user using the operation unit 314. The specific procedure through which the user selects a job will be described with reference to FIGS. 5 to 7. FIG. 5 is a diagram illustrating a copy screen 500 of the MFP 103 according to this embodiment, FIG. 6 is a diagram illustrating a user box screen 600 of the MFP 103 according to this embodiment, and FIG. 7 is a diagram illustrating a job selection screen 700 of the MFP 103 according to this embodiment.

At start-up, the MFP 103 usually causes the LCD 401 to display the copy screen 500 shown in FIG. 5. Next, if the user clicks a box button at the top of the copy screen 500, the user box screen 600 shown in FIG. 6 is displayed on the LCD 401. The user box screen 600 is a screen for checking and processing jobs that have been stored in the memory of the MFP 103. For example, the job introduced by the user from the personal computer 102 can be checked by clicking the button (center of the screen) of the box number designated at the time of job introduction.

If a box number is clicked on the user box screen 600, the job selection screen 700 shown in FIG. 7 is displayed on the LCD 401. Illustrated in FIG. 7 as one example is a screen for a case where a Box No. 00 has been selected on the user box screen 600. Here it is assumed that a normal job, N-in-1 job and saddle stitching job have been introduced in the order mentioned from the top of FIG. 7.

Figure 11:
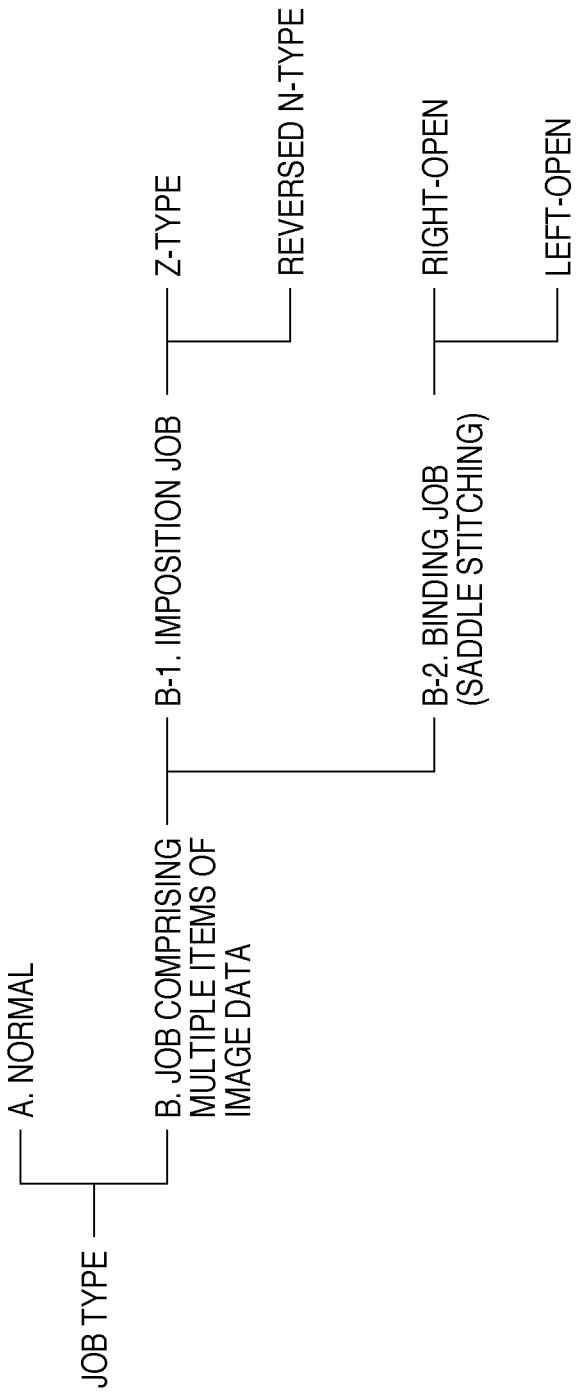
FIG. 11 is a diagram illustrating types of jobs according to this embodiment.

Each job will be described with reference to FIG. 11. FIG. 11 is a diagram illustrating types of jobs according to this embodiment. A normal job indicated at A in FIG. 11 means an ordinary print job for which imposition and binding processing have not been executed. An N-in-1 job indicated at B-1 in FIG. 11 signifies a job in which N pages of image data have been lay out as a single item of image data. A page layout such as Z-type or reversed N-type layout can be set for an N-in-1 job. A saddle stitching job indicated at B-2 in FIG. 11 is a job in which two pages of image data have been lay out as a single item of image data. The saddle stitching job has setting of right-open and left-open.

The layout (output format) of each job will be described with reference to FIGS. 12 to 16. FIG. 12 is a diagram illustrating layout of a normal job. In the case of a normal job, one page of page image data 1201 is thus lay out for every single item of image data 1202 of an image file 1203.

Figure 13:
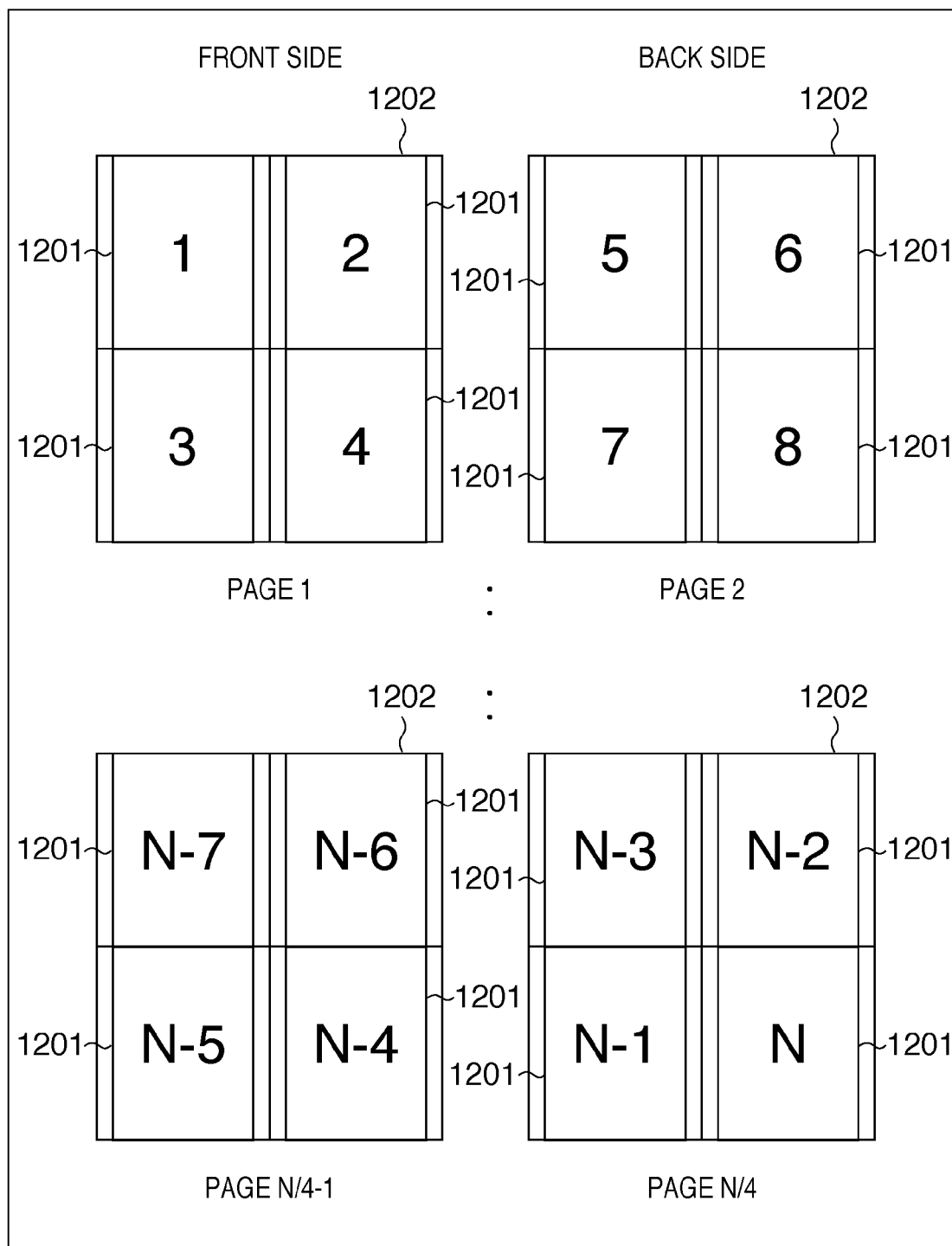
FIG. 13 is a diagram illustrating layout of a Z-type 4-in-1 imposition job.

FIG. 13 is a diagram illustrating layout of a Z-type 4-in-1 imposition job. In the case of a 4-in-1 job, four pages of page image data 1201 are lay out for every single item of image data 1202 of an image file. Since the job shown in FIG. 13 is of the Z-type, first, second, third and fourth pages of reduced size are laid out at the upper left, upper right, lower left and lower right, respectively, of a single sheet.

Figure 14:
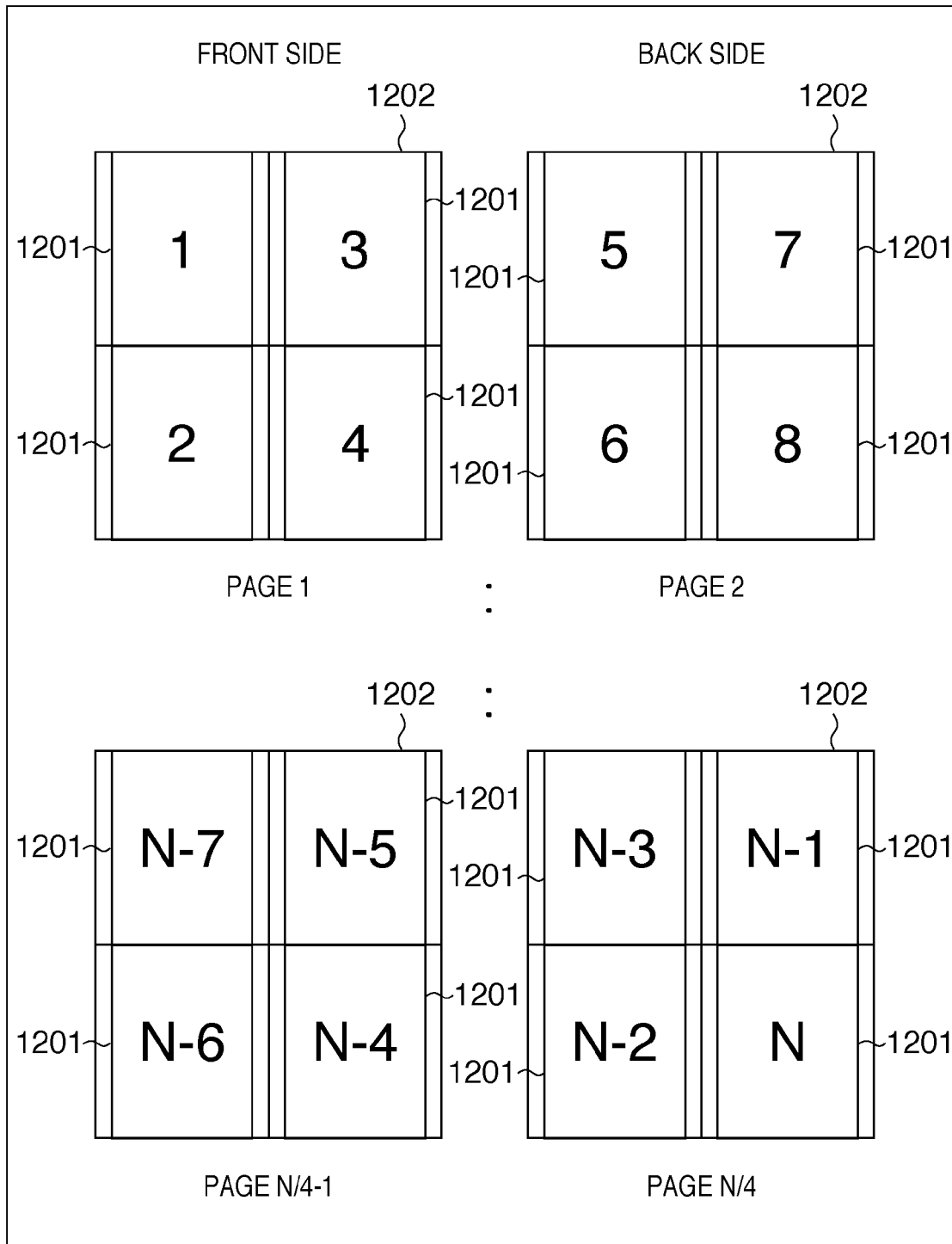
FIG. 14 is a diagram illustrating layout of a reversed N-type 4-in-1 imposition job.

FIG. 14 is a diagram illustrating layout of a reversed N-type 4-in-1 imposition job. Here the layout order of the page image data 1201 differs from that of FIG. 13. More specifically, as illustrated in FIG. 14, first, second, third and fourth pages of reduced size are laid out at the upper left, lower left, upper right and lower right, respectively, of a single sheet.

Figure 15:
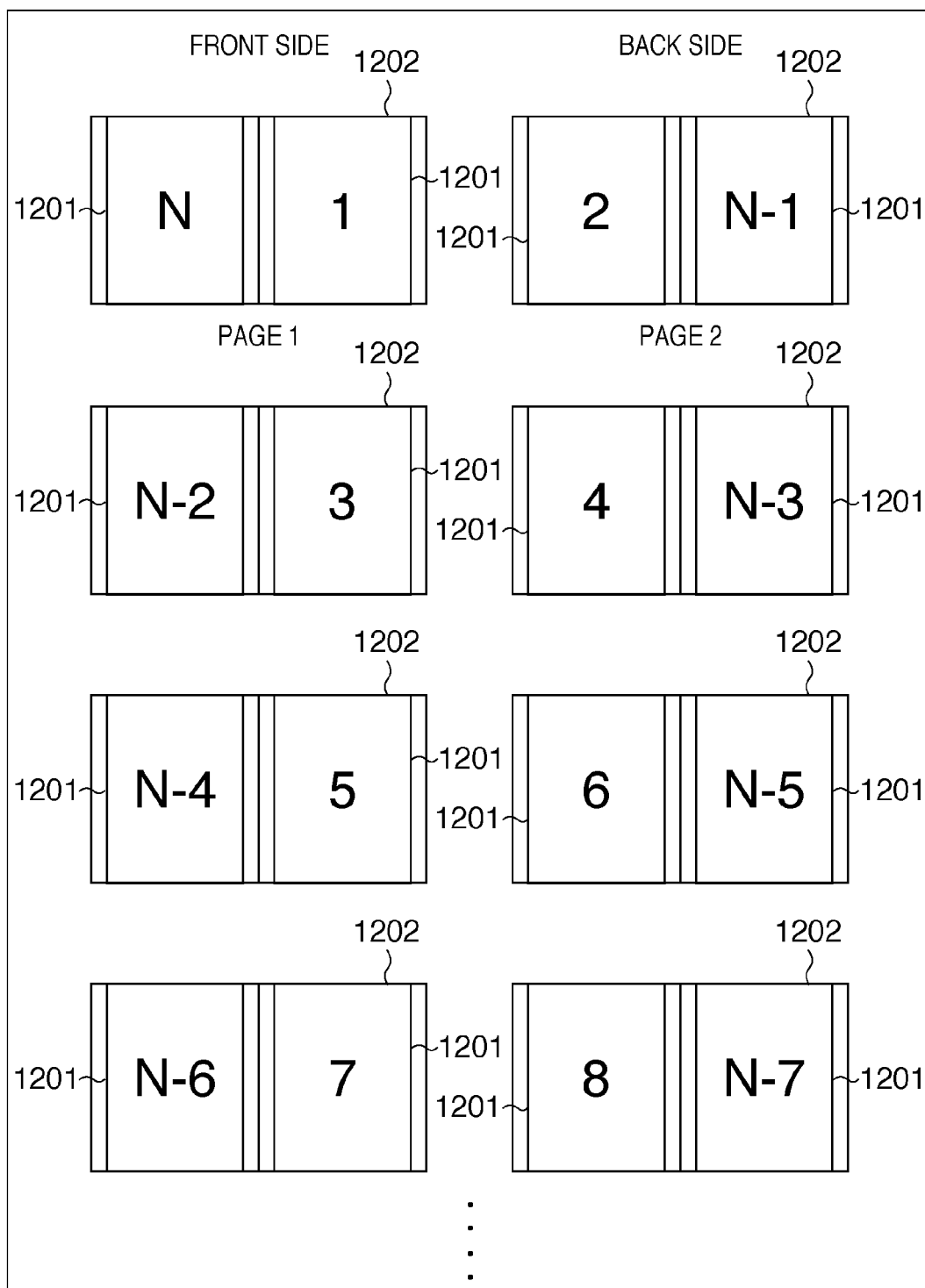
FIG. 15 is a diagram illustrating layout of a left-open saddle stitching job.
Figure 16:
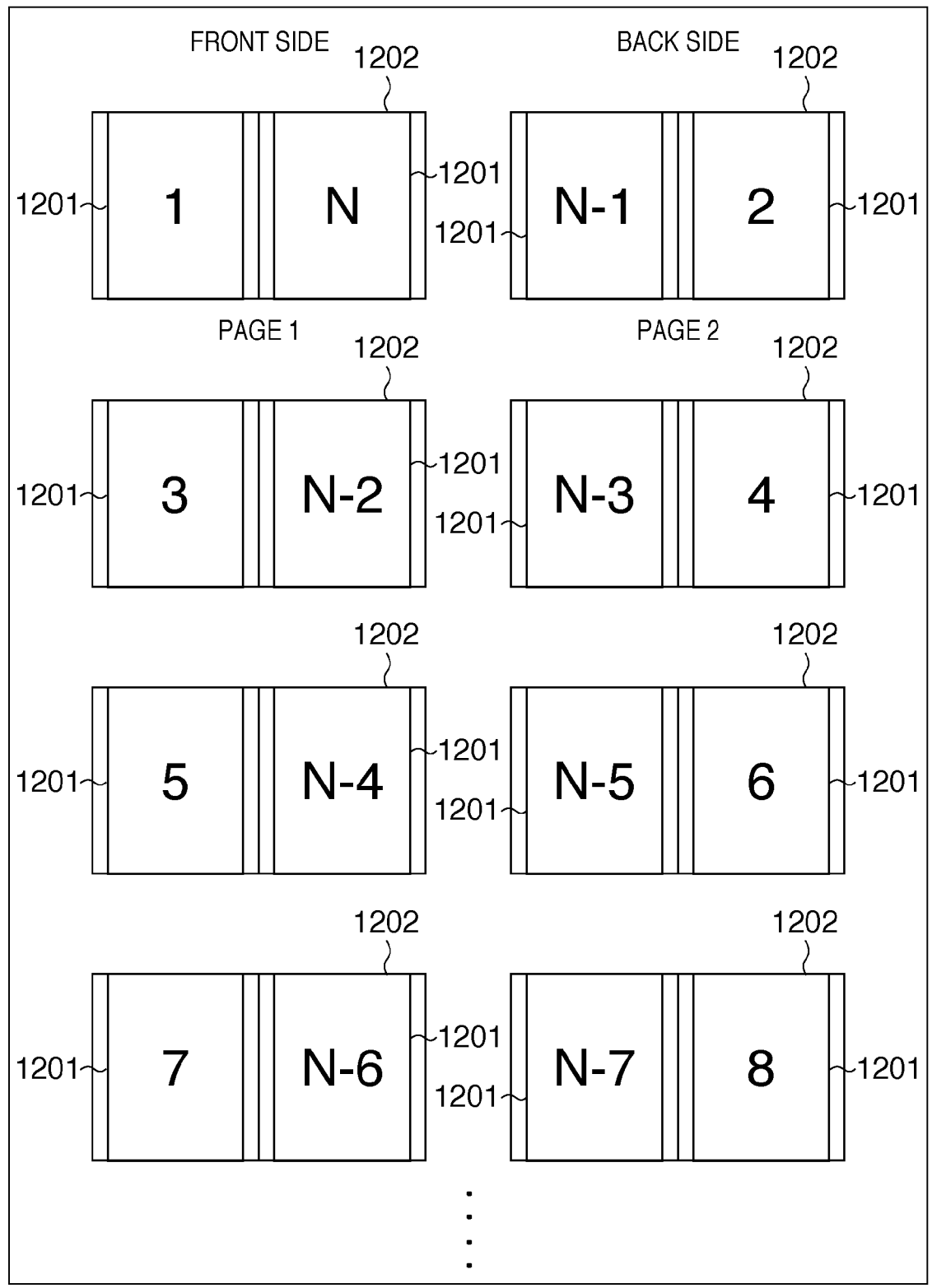
FIG. 16 is a diagram illustrating layout of a right-open saddle stitching job.

FIG. 15 is a diagram illustrating layout of a left-open saddle stitching job, and FIG. 16 is a diagram illustrating layout of a right-open saddle stitching job. As illustrated in FIG. 15, in the case of a left-open saddle stitching job, an Nth page of page image data 1201 is laid out on the left side and a first page of page image data 1201 is laid on the right side of a first item of image data 1202. As illustrated in FIG. 16, on the other hand, in the case of a right-open saddle stitching job, an first page of page image data 1201 is laid out on the left side and an Nth page of page image data 1201 is laid on the right side of a first item of image data 1202.

Since the imposition order thus changes depending upon the job setting, the division determination is performed based upon the information of the job ticket in this embodiment.

With reference again to the flowchart of FIG. 17, when a job is selected via the job selection screen 700 in step S1701, the job controller 306 checks the setting of the selected job in step S1702. Specifically, the job controller 306 acquires the job setting, i.e., information concerning the above-mentioned job type (normal job, N-in-1 job or saddle stitching job, etc.) from the memory of the MFP 103.

Next, in step S1703, the job controller 306 determines whether a plurality of pages of page image data 1201 have been laid out on a single item of image data 1202. Here the job controller 306 causes control to transition to step S1705 if it determines that a plurality of pages of page image data 1201 have been laid out on a single item of image data 1202. On the other hand, if the job controller 306 determines that a single page of page image data 1201 has been laid out on a single item of image data 1202, then the job controller 306 causes processing to proceed to step S1704.

In step S1704, the job controller 306 determines that the selected job is a normal job and exercises control so as to gray out the display of a divide-and-output button 801 included on the job selection screen 800 shown in FIG. 8 and prohibit the division of the page image data 1201. FIG. 8 is a diagram illustrating the job selection screen 800 according to this embodiment. The divide-and-output button 801 is a button used in order to execute divide-and-output processing of the image data 1202. Accordingly, since the image data 1202 contains only a single page of page image data page image data 1201, it is not necessary to execute divide-and-output processing and therefore control is exercised in such a manner that this button cannot be selected. Then, in step S1709, the job controller 306 executes selected-job output processing and terminates processing.

On the other hand, if the job controller 306 determines in step S1705 that the selected job is an N-in-1 job or saddle stitching job, then divide-and-output buttons 901, 1001 included on job selection screens 900, 1000 shown in FIGS. 9 and 10, respectively, are displayed so as to be selectable. FIG. 9 is a diagram illustrating the job selection screen 900 in a state in which an N-in-1 job has been selected in this embodiment, and FIG. 10 is a diagram illustrating the job selection screen 1000 in a state in which a saddle stitching job has been selected in this embodiment.

When the divide-and-output button 901 or 1001 is clicked, the job controller 306 determines in step S1706 whether the job selected in step S1701 is an N-in-1 job. If the job is the N-in-1 job, then the job controller 306 causes processing to proceed to step S1707 to execute divide-and-output processing for the N-in-1 job, which will be described later with reference to FIG. 18.

Figure 19:
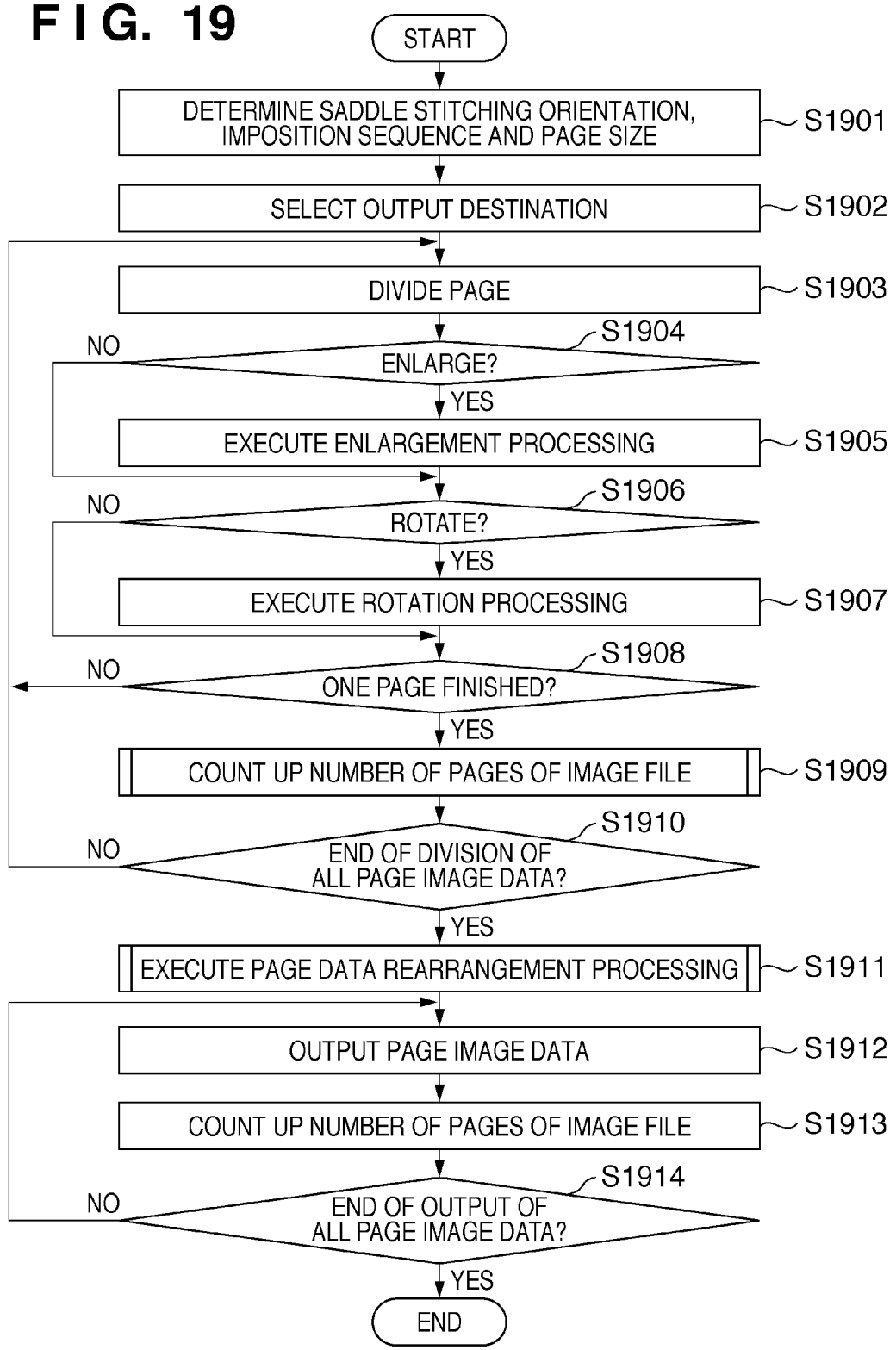
FIG. 19 is a flowchart illustrating divide-and-output processing at the time of a saddle stitching job according to this embodiment.

If it is determined that the job is not an N-in-1 job, on the other hand, then the job controller 306 decides that the selected job is a saddle stitching job and causes processing to proceed to step S1708 to execute divide-and-output processing for the saddle stitching job, which will be described later with reference to FIG. 19.

<Processing for N-in-1 Job>

Figure 18:
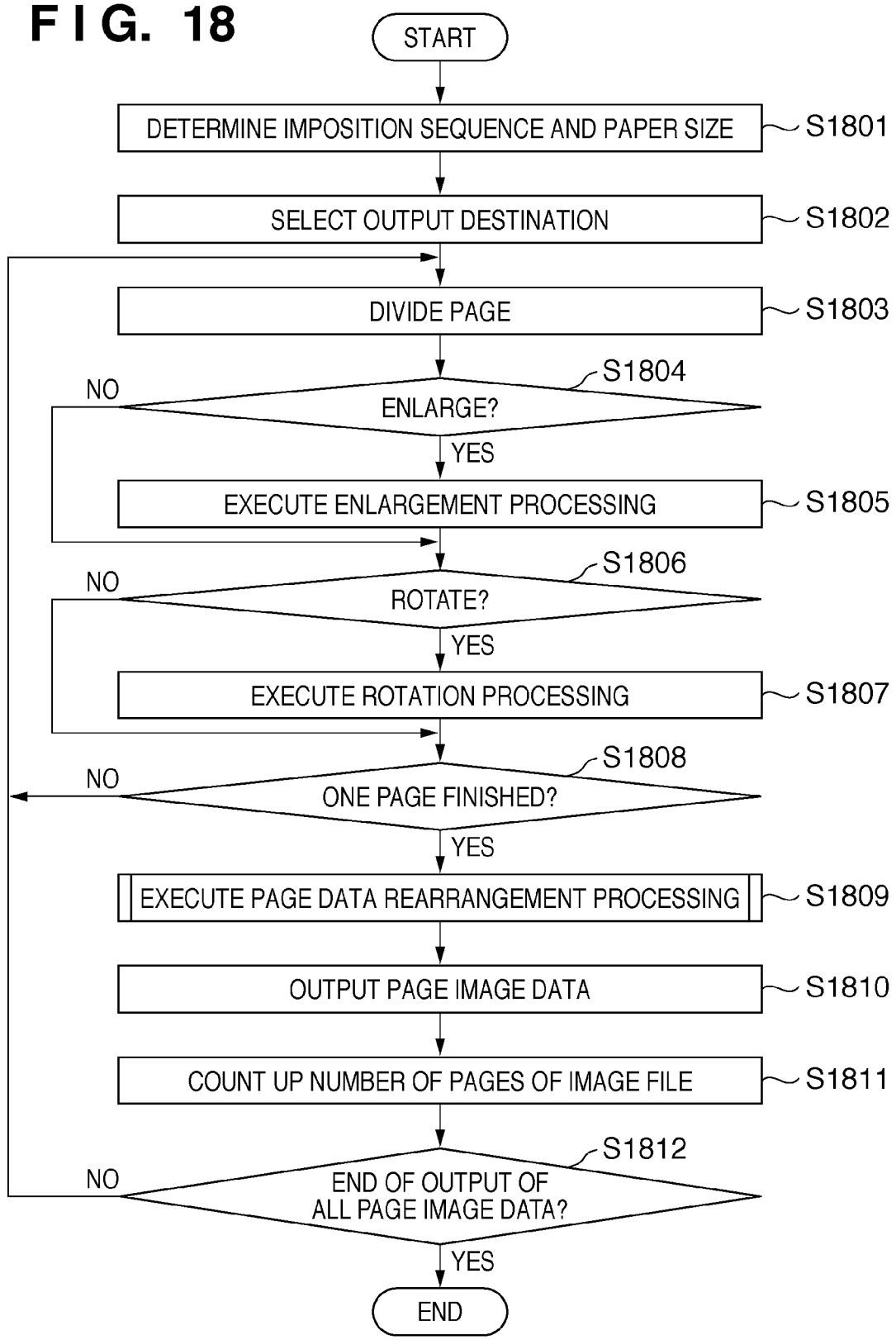
FIG. 18 is a flowchart illustrating divide-and-output processing at the time of an N-in-1 job according to this embodiment.
Figure 20:
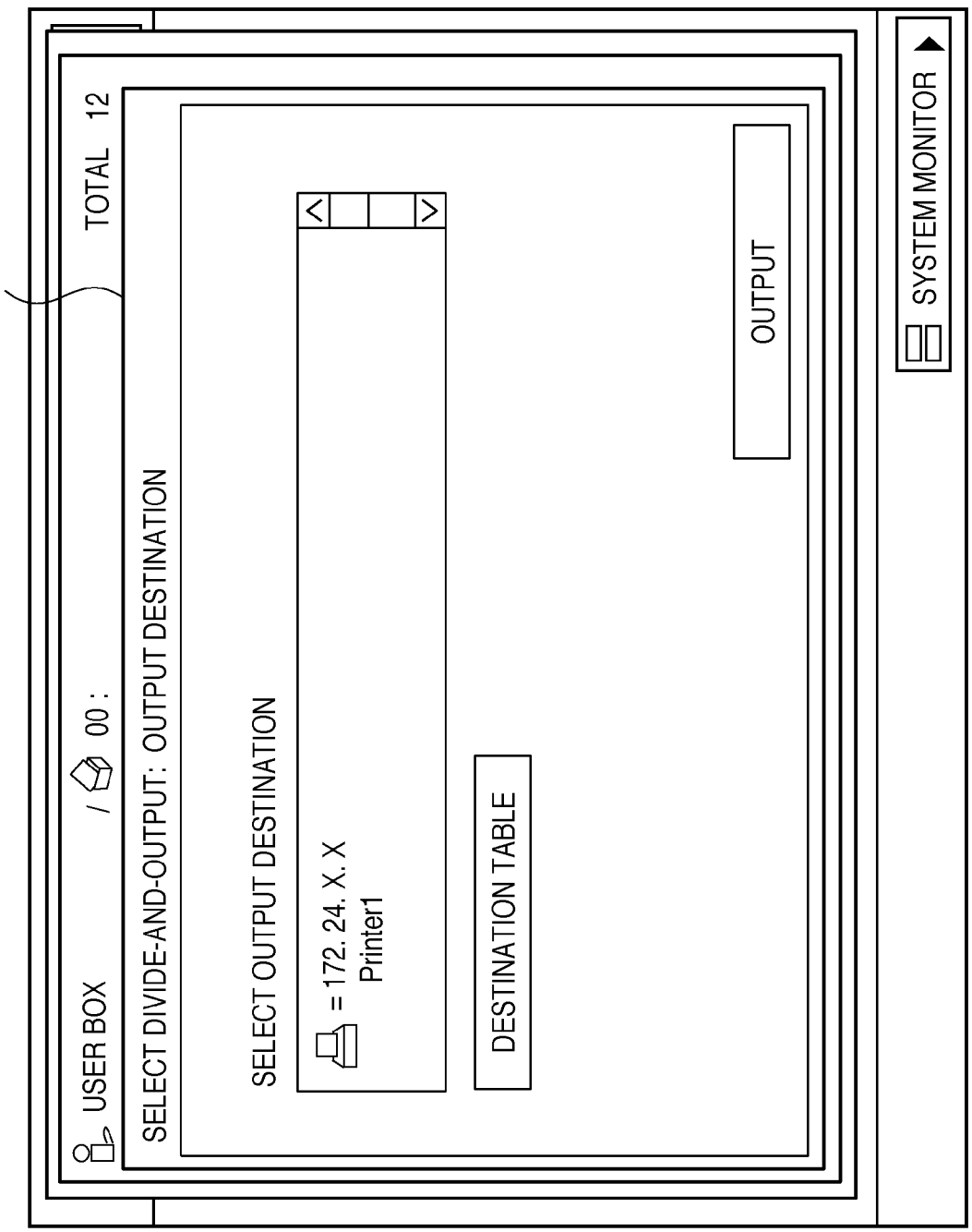
FIG. 20 is a diagram illustrating an output-destination selection screen 2000.

Next, divide-and-output processing for an N-in-1 job will be described with reference to FIGS. 18 and 20. FIG. 18 is a flowchart illustrating divide-and-output processing at the time of an N-in-1 job according to this embodiment. The processing described below is executed under the overall control of the job controller 306. It should be noted that the processing described below corresponds to the processing at S1707 in FIG. 17.

First, in step S1801, the job controller 306 determines what the imposition sequence (Z-type or reversed N-type) and page size of this job are. This processing may be executed at the time of job selection, which is shown in FIG. 9, using the LCD 401 of the MFP 103. If the user clicks the divide-and-output button 901, then the job controller 306 displays an output-destination selection screen 2000, which is shown in FIG. 20, on the LCD 401 in step S1802. FIG. 20 is a diagram illustrating the output-destination selection screen 2000. The selected destination can be registered using a separately prepared destination-table management screen. Besides printing (Printer1) as the output destination, it is possible to transfer a plurality of pages of page image data 1201, which have been divided and generated, to a designated IP address of an external device such as personal computer 105, where the IP address is registered in advance.

When the confirmation of the setting of the job ticket and the selection of the output destination are completed, in step S1903, the job controller 306 divides the page image data 1201 from the image data 1202 in accordance with the assignment of the job in step S1803. Next, in steps S1804 to S1807, the job controller 306 executes processing such as enlargement (S1804) and rotation (S1805) in accordance with paper size for every individual item of page image data 1201 obtained by division.

The processing of steps S1803 to S1807 is repeatedly executed a number of times equivalent to the number of items of page image data 1201 that have been lay out to the image data 1202. In step S1808, therefore, the job controller 306 determines whether the division processing of one item of image data 1202 has ended and transitions processing to step S1809 if division processing has ended. If division processing has not ended, then processing returns to S1803.

When all division processing of the page image data 1201 that has been lay out to one item of image data 1202 ends, the job controller 306 executes processing for rearranging the generated page image data 1201 in step S1809. Then, in step S1810, the job controller 306 outputs the divided page image data 1201 to the output destination selected in step S1802.

Next, in step S1811, the job controller 306 counts up the number of pages of the image file 1203. Furthermore, in step S1812, the job controller 306 determines whether output of all image data has ended by checking the counter updated at S1811. When division processing applied to all image data 1202 ends, the job controller 306 terminates processing. Otherwise, the job controller 306 returns processing to S1803.

<Processing for Saddle Stitching Job>

Next, divide-and-output processing for a saddle stitching job will be described with reference to FIGS. 19 and 20. FIG. 19 is a flowchart illustrating divide-and-output processing at the time of a saddle stitching job according to this embodiment. The processing described below is executed under the overall control of the job controller 306. It should be noted that the processing described below corresponds to the processing at S1708 in FIG. 17.

First, in step S1901, the job controller 306 determines what the saddle stitching orientation (left-open or right-open), imposition sequence and page size of this job are. This processing may be executed at the time of job selection, which is shown in FIG. 10, using the LCD 401 of the MFP 103. If the user clicks the divide-and-output button 1001, then the job controller 306 displays the output-destination selection screen 2000 on the LCD 401 in step S1902. The selected destination can be registered using a separately prepared destination-table management screen. Besides printing (Printer1) as the output destination, it is possible to transfer a plurality of pages of page image data 1201, which have been divided and generated, to a designated IP address of an external device such as personal computer 105, where the IP address is registered in advance.

When the confirmation of the setting of the job ticket and the selection of the output destination are completed, the job controller 306 divides the page image data 1201 from the image data 1202 in accordance with the assignment of the job. Next, in steps S1904 to S1907, the job controller 306 executes processing such as enlargement (S1904) and rotation (S1905) in accordance with paper size for every individual item of page image data 1201 obtained by division.

The processing of steps S1903 to S1907 is repeatedly executed a number of times equivalent to the number of items of page image data 1201 that have been lay out to the image data 1202. In step S1908, therefore, the job controller 306 determines whether the division processing of one item of image data 1202 has ended and transitions processing to step S1909 if division processing has ended. If division processing has not ended, then processing returns to S1903.

In the case of saddle stitching, as illustrated in FIGS. 15 and 16, the first page of page image data 1201 and the final page of page image data 1201 are lay out to the first page of image data 1202. Unlike division processing at the time of the N-in-1 job, therefore, the rearranging operation cannot be performed merely by dividing one page of image data. In step S1909, therefore, the job controller 306 counts up the number of pages of image data. Next, in step S1910, the job controller 306 repeatedly executes the processing of steps S1903 to S1909 until all pages of the image data are divided into the page image data 1201.

When division of all pages of the image data file ends, the job controller 306 executes processing for rearranging the page image data 1201 in step S1911. Then, in step S1912, the job controller 306 outputs the page image data 1201 to the output destination selected in step S1902. Next, in step S1913, the job controller 306 counts up the number of pages of the page image data 1201 that have been output. Then, in step S1914, the job controller 306 repeats the processing of S1912 and S1913 until output of all of the page image data 1201 ends.

<Setting of Divide-and-Output Processing>

Figure 21:
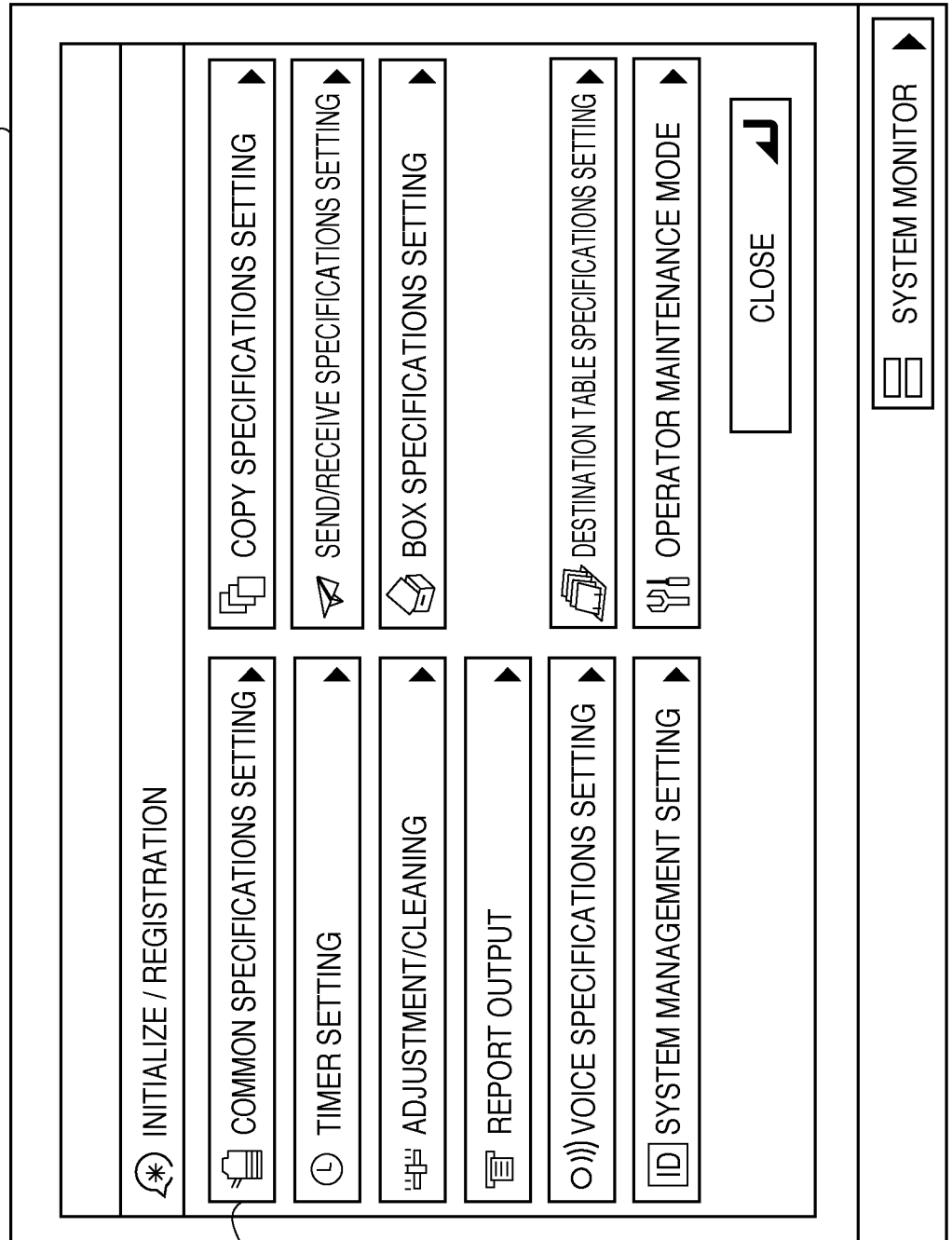
FIG. 21 is a diagram illustrating a setting screen 2100 of the multifunction peripheral 103.

Next, setting of divide-and-output processing will be described with reference to FIGS. 21 to 23. FIG. 21 is a diagram illustrating a setting screen 2100 of the MFP 103, FIG. 22 is a diagram illustrating a common specifications setting screen 2200, and FIG. 23 is a diagram illustrating a divide-and-output setting screen 2300.

In a case where the user desires to set excerpting of the page image data 1201, first the user clicks a common specifications setting key 2101 displayed on the setting screen 2100 shown in FIG. 21. When the common specifications setting key 2101 is clicked, the common specifications setting screen 2200 shown in FIG. 22 is displayed on the LCD 401. Furthermore, the divide-and-output setting screen 2300 shown in FIG. 23 is displayed on the LCD 401 by clicking a divide-and-output setting key 2201 on the common specifications setting screen 2200.

By using the divide-and-output setting screen 2300, it is possible to set file format 2301 of output page image data, output paper size 2302, crossmark mask 2303 and blank-sheet deletion 2304. The set information is stored in the resource management unit 309 of the MFP 103. The settings rendered effective on the divide-and-output setting screen 2300 are used in a case where divide-and-output has been selected.

In this embodiment, formats such as PDF, Tiff, BMP, JPEG and JBIG, etc., can be set as file formats. Further, if crossmark mask is set, marks for cutting paper or the like are added to the page image data. If blank-sheet deletion 2304 is set, image data is output upon deleting page image data consisting of blank data.

As described above, when the image processing apparatus according to this embodiment processes a stored job, the apparatus determines the output format that has been set in the job ticket and decides whether or not to divide image data in accordance with the output format determined. Furthermore, the image processing apparatus changes over the output timing of the page image data divided in accordance with the output format determined. Specifically, the image processing apparatus of this embodiment executes processing for dividing image data in a case where a plurality of pages of page image data have been lay out to image data with regard to a single sheet, e.g., in case of a saddle stitching job or N-in-1 job.

Thus, with the image processing apparatus of this embodiment, the timing at which image data is output is changed in accordance with the job settings (paper size, N-in-1, saddle stitching, rotation, etc.). Specifically, in a case where the output format is saddle stitching, the image processing apparatus starts output after dividing the page image data with regard to all image data. On the other hand, in a case where the output format is N-in-1, the image processing apparatus starts output whenever image data with regard to one sheet is divided into N pages of page image data. As a result, in a case where the output format is N-in-1, output processing can be executed more efficiently. Thus, in the case of division of a job in which a number of pages of page data have been impositioned, the time it takes for the MFP to execute image generation processing can be kept short and an output result in the proper output order can be obtained.

Further, in the case of a normal job in which a single page of page image data is lay out to image data with regard to one sheet, processing for dividing the image data is prohibited. As a result, the image processing apparatus is capable of executing the job efficiently without executing needless processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-335062, filed on Dec. 26, 2007, which is hereby incorporated by reference herein in its entirety.

What is claimed is:

1. An image processing apparatus comprising:
a storage unit configured to store a first type of image data in which a plurality of pages of image data are laid out in page order for executing bookbinding on a plurality of sheets, and a second type of image data in which a plurality of pages of image data are laid out in page order for executing N-in-1 printing on a plurality of sheets;
a division unit configured to divide the plurality of pages of image data included in the first type of image data or the second type of image data stored in the storage unit into individual pages of image data;
an arranging unit configured to arrange the page order of the plurality of pages of image data that have been divided by the division unit; and
a controller unit configured to start, in a case where the division unit divides the plurality of pages of image data included in the first type of image data, output of the plurality of pages of image data divided by the division unit after the arranging unit has completed the arrangement of the page order of the plurality of pages of image data divided by the division unit, and to start, in a case where the division unit divides the plurality of pages of image data included in the second type of image data, output of the pages of image data divided by the division unit before the arranging unit has completed the arrangement of the page order of the plurality of pages of image data divided by the division unit.

2. The apparatus according to claim 1, wherein the bookbinding is saddle stitching.

3. The apparatus according to claim 1, wherein, in a case where the division unit divides the plurality of pages of image data included in the second type of image data, the controller unit is configured to control to output the pages of image data divided by the division unit each time the N pages of image data regarding one sheet is divided.

4. The apparatus according to claim 1, wherein the storage unit further stores a third type of image data in which a single page of image data is laid out on each of the plurality of sheets, and wherein the division unit is configured to not execute division for the third type of image data.

5. The apparatus according to claim 1, wherein the controller unit is configured to control to print the pages of image data.

6. The apparatus according to claim 1, further comprising an enlargement unit configured to enlarge the pages of image data included in the first type of image data or the second type of image data.

7. The apparatus according to claim 1, wherein the controller unit is configured to control to output crossmark-masked data as the plurality of pages of image data.

8. The apparatus according to claim 1, wherein the controller unit is configured to control to output the plurality of pages of image data from which blank data devoid of image data has been deleted.

9. A method of controlling an image processing apparatus, the method comprising the steps of:
storing, in a storage unit of the image processing apparatus, a first type of image data in which a plurality of pages of image data are laid out in page order for executing bookbinding on a plurality of sheets, and a second type of image data in which a plurality of pages of image data are laid out in page order for executing N-in-1 printing on a plurality of sheets;
dividing the plurality of pages of image data included in the first type of image data or the second type of image data stored in the storage unit into individual pages of image data;
arranging the page order of the plurality of pages of image data that have been divided in the dividing step; and
starting, in a case where the plurality of pages of image data included in the first type of image data are divided, output of the plurality of pages of image data divided in the dividing step after the arrangement of the page order of the plurality of pages of image data divided in the dividing step has completed, and starting, in a case where the plurality of pages of image data included in the second type of image data are divided, output of the pages of image data divided in the dividing step before the arrangement of the page order of the plurality of pages of image data divided in the dividing step has completed.

* * * * *